Sept. 9, 1941.  J. D'ARCEY  2,255,310
OIL GAUGE
Filed March 25, 1939
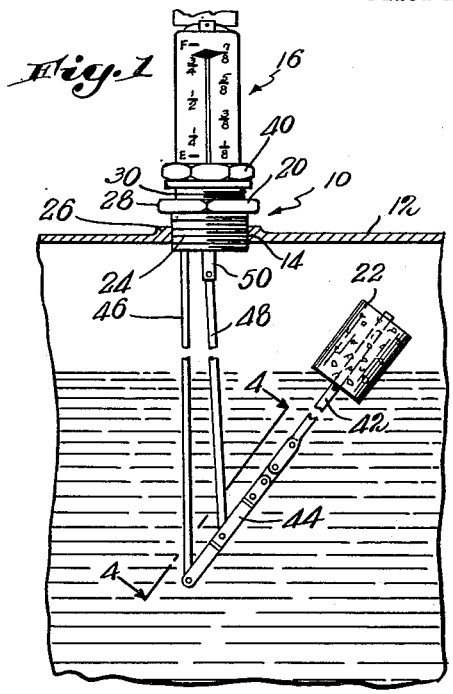
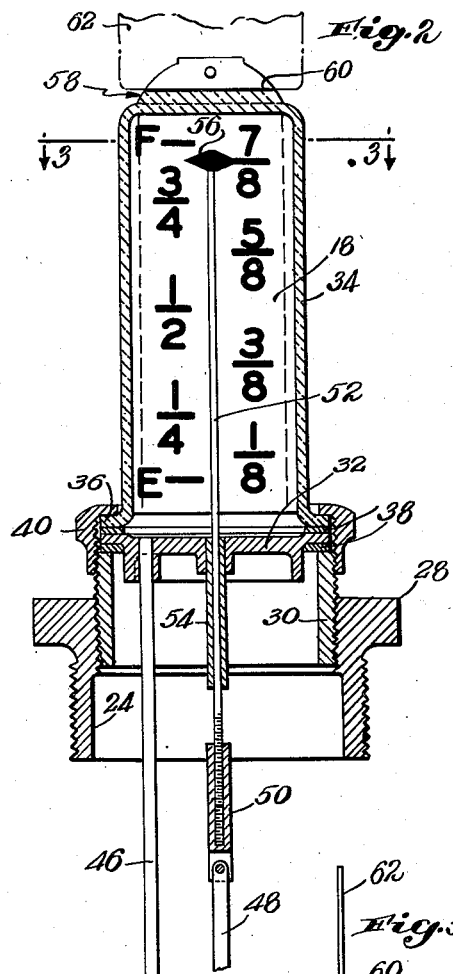
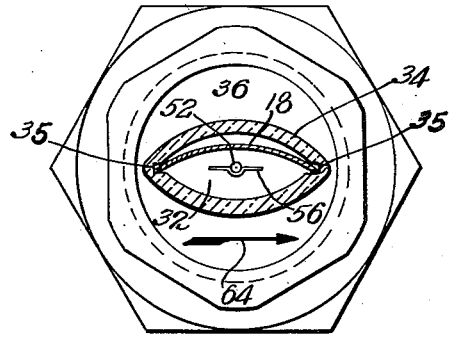
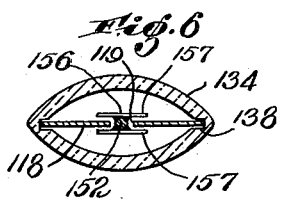
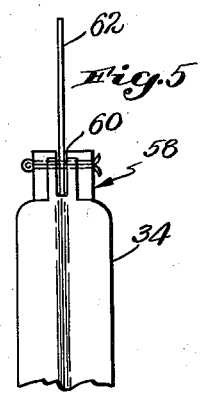
Inventor
John D'Arcey,
By Roberts, Cushman & Woodbury
his Attys.

Patented Sept. 9, 1941

2,255,310

UNITED STATES PATENT OFFICE 2,255,310

OIL GAUGE

John D'Arcey, Swampscott, Mass.

Application March 25, 1939, Serial No. 264,077

2 Claims. (Cl. 73—317)

This invention relates to an improvement in oil gauges and more particularly in a gauge for fuel oil tanks of the type set forth in my Patent No. 2,098,085 granted November 2, 1937, by which gauge the amount of oil in the tank can be visually ascertained at any time, such gauge being detachably mounted upon the tank.

The primary object of this invention is to provide an oil gauge which is detachably mounted upon the tank, is easily installed regardless of the amount of oil in the tank, is readily adjusted so that it will function freely and so that the dial is visible from any desired angle and capable of being calibrated without removal from the tank in order to insure accurate readings.

These and other objects of this invention will appear from a consideration of the following description of one embodiment of the invention and of the drawing which forms a part thereof and in which—

Fig. 1 is a view in elevation of an oil gauge embodying this invention mounted upon an oil tank shown in section;

Fig. 2 is an enlarged longitudinal section of the head and associated elements of the gauge;

Fig. 3 is a sectional plan view thereof taken along the line 3—3 in Fig. 2;

Fig. 4 is a view taken along the line 4—4 in Fig. 1 upon an enlarged scale of one element of the gauge;

Fig. 5 is a view in elevation of the top of the gauge taken at right angles to the view in Figs. 1 and 2; and Fig. 6 is a view similar to Fig. 3 of a portion of the head showing another arrangement of the elements.

As shown in the drawing the gauge 10 is carried by a tank 12 having an opening 14 through which the lower portion of the gauge enters the interior of the tank. The upper portion of the gauge which is outside the tank comprises a head 16 including a dial 18 and a mounting 20. The lower portion of the gauge comprises a float 22 and means by which movement of the float is transmitted to the head and the contents of the tank are indicated upon the dial.

The mounting 20 comprises an annular plug 24 which engages a boss 26 on the tank which boss surrounds the opening 14. Preferably but not necessarily the plug and boss are threaded as shown, the plug including an integral flange 28 adapted to receive a wrench by which the plug is moved relative to the boss. The inner face of the plug is threaded to receive a nipple 30 on the end of which rests an annular plate 32 which supports the head 16. The head includes a tubular casing 34 which surrounds the dial 18. The casing 34 is closed at the top and is provided with an annular flange 36 preferably of the same diameter as the plate 32. Gaskets 38 separate the plate 32 from the top of the nipple 30 and from the flange 36. A nut 40 serves to clamp the flange 36 and plate 32 to the top of the nipple 30 and the gaskets 38 serve to prevent leakage. The plug 24 and nipple 30 act as a unit after they have been assembled and may if desired be replaced by a single nipple.

The casing 34 of the head is made of transparent material such as synthetic resin preferably that sold under the trade name "Tenite" which is moldable and unbreakable. As shown particularly in Fig. 3 the head is ovate having at the ends grooves 35 which receive the side edges of the dial 18.

The float 22 is secured to one end of a rod 42 supported at the other end by a pair of parallel arms 44 which are pivoted to the lower end of a post 46 carried by the plate 32. The arms 44 extend at opposite sides of the post 46 and are pivotally connected intermediate their ends to the lower end of a rod 48. The rod 48 is connected by a nipple 50 to a rod 52. The rod 52 passes through the plate 32 being guided by a sleeve 54 and carries at its upper end an index finger 56 which projects at opposite sides of the rod 52. The nipple 50 is pivoted at one end to the rod 48 and is internally threaded to mesh with the externally threaded lower end of the rod 52. The sleeve 54 is here shown at the center of the plate and the dial 18 is of such width that when inserted in the grooves 35 it is bowed (Fig. 3). The rod 52 with its finger 56 reciprocates in front of the dial and the finger 56 thereon coacts with the latter to indicate the amount of oil in the tank.

The casing 34 of the head may be provided with a boss 58 having a slot 60 therein. In that slot may be inserted a card 62 having the dealer's business address, telephone number, gauge calibrations in gallons or other desired information.

The gauge is assembled with the tank in the following manner. The plug 24 with the nipple 30 mounted thereon is first seated in the opening 14. The float 22 is inserted into the tank through the nipple 30 and the gauge lowered until the plate 32 rests upon the top of the nipple. In order that the float 22 be set so that it will rise and fall freely upon the top of the oil in the tank without touching the walls of the tank an arrow 64 on the face of the plate is provided to indicate to the assembler the direction in which the rod 44 extends. The nut 40 is then threaded onto the nipple 30 to clamp the plate 32 in place.

Should, as is usually the case, the gauge be found inaccurate for any reason so that it indicates an amount of oil greater or less than the correct amount the nut 40 is loosened sufficiently to permit the casing 34 to be rotated relative to the plate 32. The rod 52 is so positioned in front of the dial 18 that when the casing 34 is turned the dial contacts with the finger 56 and turns the rod 52 in the nipple 50 thus raising or lowering the float as desired until the finger correctly indicates on the dial the amount of oil in the tank. These calibrations are usually and most easily made when the tank is either full or empty. Since the casing 34 is rotatable freely above the plate, the dial 18 may be set when the nut 40 is loosened, so that the insignia thereon will be visible from the most convenient angle. After the gauge has been calibrated (if that is necessary), and the dial positioned, the nut is tightened securely so that the tank is sealed.

It will be noted that the calibration of this gauge depends primarily upon the fact that the connection of the rod 52 to the rod 48, here shown as the nipple 50, permits a longitudinal adjustment of the rod 52 relative to the rod 48. As pointed out above this adjustment may be carried out by rotating the casing 34 with the dial 18, but if desired the casing may be so positioned upon the mounting that it is not, in itself, rotatable and under such conditions the casing would be removed and the rod 52 rotated or otherwise adjusted by hand.

Fig. 6 illustrates an arrangement of the dial and index finger which differs from that shown in Fig. 3 in certain respects. The dial 118 is of such width that it is not bowed when seated in the grooves 138 of the casing 134. A slot 119 extending from the lower edge of the dial 118 allows the rod 152 to reciprocate freely in the casing. Fixed to the rod 152 is a double index finger 156. The pointers 157 of the finger 156 are on opposite faces of the dial so that the indicia may be placed on both sides. The calibration of the gauge having the arrangement shown in Fig. 6 is obviously carried out in the same manner as described above, since upon the rotation of the casing, the dial and index finger will be brought into contact and the finger-carrying rod will be rotated.

While one embodiment of the invention has been shown and described in detail it will be understood that other embodiments may be made without departing from the spirit and scope of the invention as set forth in the following claims.

I claim:

1. A gauge adapted to be mounted upon and to indicate the contents of a tank and comprising a head including a casing and a dial enclosed within said casing, a mounting for the head carried by the tank, a float within the tank and riding upon the liquid therein and means connecting said float and head, said means including a rod made of several portions, one of which enters the casing and carries an index finger which is adjacent to and coacts with the dial of the head to indicate the contents of the tank, the finger-carrying portion of the rod being rotatable relative to the remainder of the rod, and the casing being rotatable with the dial relative to the mounting so that upon the rotation of the casing, the dial contacts with the finger and causing rotation of the rod whereby the position of the finger with respect to the dial is adjusted and the gauge calibrated without removing it from the tank.

2. A gauge adapted to be mounted upon and to indicate the contents of a tank and comprising a head, including a casing and a dial, outside the tank, a mounting for the head carried by the tank, a float within the tank and riding upon the liquid therein, said head including a flange and said mounting including a plate upon which said flange rests and means engaging said flange to lock the head in place, a post depending from said plate into the tank, means pivotally connected to said post and to which means said float is attached, a rod pivoted to said last-named means, a second rod connected to said first rod and extending through an opening in the plate into the head casing adjacent the dial, an index finger on said second rod, said rods being raised and lowered as a unit in response to the movement of the float, and said finger being adjacent to and coacting with the dial to indicate the contents of the tank, said rods being joined end to end by a nipple pivotally attached to the end of one rod and in threaded engagement with the end of the other rod and said casing being rotatable with the dial relative to the mounting so that upon the rotation of the casing the dial contacts with the finger and causes rotation of the second rod relative to the first rod, thus moving the second rod longitudinally of the first rod so that the finger on the second rod is raised or lowered relative to the dial and the gauge calibrated without removing it from the tank.

JOHN D'ARCEY.